United States Patent [19]

Ishibashi et al.

[11] 4,014,183

[45] Mar. 29, 1977

[54] ABSORPTION REFRIGERATOR OF NATURAL CIRCULATION TYPE

[75] Inventors: Toshihiro Ishibashi; Satoshi Naito, both of Kosai, Japan

[73] Assignee: Yazaki Sogyo Kabushiki Kaisha, Tokyo, Japan

[22] Filed: June 11, 1975

[21] Appl. No.: 586,041

[30] Foreign Application Priority Data

July 2, 1974 Japan .................. 49-75020

[52] U.S. Cl. .................. 62/476; 62/488; 62/495; 62/497

[51] Int. Cl.² .................. F25B 15/00; F25B 33/00

[58] Field of Search ............ 62/476, 487, 495, 497, 62/488

[56] References Cited

UNITED STATES PATENTS

| | | | |
|---|---|---|---|
| 1,796,410 | 3/1931 | Schurtz | 62/488 |
| 2,112,537 | 3/1938 | Kuenzli | 62/488 |
| 2,285,788 | 6/1942 | Woodson | 62/488 |
| 2,408,802 | 10/1946 | Miller et al. | 62/488 |
| 3,041,853 | 7/1962 | Harwich | 62/497 |
| 3,137,144 | 6/1964 | Kaufman et al. | 62/495 |
| 3,140,589 | 7/1964 | Merrick | 62/488 |
| 3,495,420 | 2/1970 | Loweth et al. | 62/476 |
| 3,540,231 | 11/1970 | Porter et al. | 62/497 X |
| 3,550,394 | 12/1970 | Peckham | 62/497 |
| 3,605,432 | 9/1974 | Wada | 62/476 |
| 3,710,852 | 1/1973 | Porter | 62/476 |
| 3,717,007 | 2/1973 | Kuhlenschmidt | 62/476 |

Primary Examiner—Lloyd L. King
Attorney, Agent, or Firm—Oldham & Oldham Co.

[57] ABSTRACT

An absorption refrigerator of natural circulation type comprising a first generator connected to the lower end of a gas-liquid lift and a second generator connected to the upper end of the gas-liquid lift. A solution of an absorbing medium, which may be an aqueous solution of a salt of lithium, is heated in the first generator to be lifted through the gas-liquid lift into the second generator, and the lithium salt solution is then concentrated to a predetermined concentration in the second generator.

1 Claim, 2 Drawing Figures

ABSORPTION REFRIGERATOR OF NATURAL CIRCULATION TYPE

BACKGROUND OF THE INVENTION

This invention relates to an absorption refrigerator of natural circulation type employing water as a refrigerant and an aqueous solution of a lithium salt as an absorbing medium. More particularly, this invention relates to an absorption refrigerator of natural circulation type in which low-temperature energy is utilized as a heat source for the generator.

U.S. Pat. No. 2,282,503 discloses a prototype of absorption refrigerators of natural circulation type with which the present invention is concerned. The refrigerator disclosed in the U.S. patent above cited employs water as a refrigerant and a lithium salt such as lithium chloride or lithium bromide as an absorbing medium, and these salts are present in the form of an aqueous solution thereof in the refrigeration system.

In the absorption refrigerator of natural circulation type referred to above, the aqueous solution of the lithium salt is heated to boil in a generator and is lifted through a gas-liquid lift into a separator located at an upper level according to the principle of an air lift pump, and the solution is separated into water vapor and the residual concentrated lithium salt solution in the separator. This water vapor is subsequently cooled to condense in a condenser, and the condensate or water is fed to an evaporator. The water fed to the evaporator is vaporized again since the internal pressure of the evaporate is sufficiently low to such an extent that the water can be readily vaporized. Due to the fact that vaporization of the water takes heat and thus produces cooling, another liquid flowing through the evaporator is cooled and this cooled liquid is suitably utilized as a source of refrigeration.

In the meantime, the concentrated lithium salt solution separated from the water vapor in the separator is supplied to a heat exchanger to be subject to heat exchange with a dilute lithium salt solution described later, and the concentrated lithium salt solution thus cooled down to a low temperature is then fed to an absorber. In the absorber, this concentrated lithium salt solution absorbs the water vapor produced in the evaporator to turn into a dilute lithium salt solution. This dilute lithium salt solution is subsequently fed to the heat exchanger to be subjected to heat exchange with the concentrated lithium salt solution as above described, and the dilute lithium salt solution thus heated as a result of the heat exchange is returned to the generator again. The cycle above described is repeated to carry out the desired refrigeration.

The function of the generator disposed in the lower part of the prior art absorption refrigerator of natural circulation type has thus been such that the generator acts to lift the dilute lithium salt solution into the separator disposed thereabove and heat is applied to the lower portion of the generator so that the concentrated lithium salt solution of desired concentration can be obtained in this separator. In other words, heating has been carried out at such a temperature which is enough to overcome both the resistance of the gas-liquid lift against liquid flow and the pressure difference due to the height of the gas-liquid lift. A heat source of high temperature such as a source of steam or oil burner has been employed hitherto to heat the generator since a high temperature can easily be obtained with such a heat source. It is presently strongly demanded from the viewpoint of economical utilization of energy to operate absorption refrigerators of natural circulation type by a heat source of low temperature such as warm water obtained by a solar heat collector or warm waste water discharged from factories. However, the prior art absorption refrigerator of natural circulation type has been unable to operate with such a low-temperature heat source.

SUMMARY OF THE INVENTION

The present invention contemplates the provision of an improved absorption refrigerator of natural circulation type which is free from the defects pointed out above and can satisfactorily and reliably operate with a low-temperature heat source of the kind above described.

It is thus a primary object of the present invention to provide an improved absorption refrigerator of natural circulation type which can operate with a low-temperature heat source by virtue of the fact that a single generator priorly employed is separated into two parts connected to the upper end and lower end respectively of a gas-liquid lift.

In accordance with the present invention, there is provided an absorption refrigerator of natural circulation type employing water as a refrigerant and a lithium salt as an absorbing medium, comprising a first generator for heating an aqueous solution of a lithium salt for lifting said dilute lithium salt solution according to the principle of an air lift pump for the purpose of causing the natural circulation of said lithium salt solution, a second generator connected by a gas-liquid lift to said first generator for concentrating said lithium salt solution fed therein so as to increase the concentration of said lithium salt solution to a predetermined desired value, a separator for separating the water vapor expelled from said lithium salt solution in said first and second generators from said concentrated lithium salt solution, a condenser for condensing the water vapor separated in said separator, an evaporator for vaporizing the water condensed in said condenser thereby cooling a secondary refrigerant flowing therethrough by the latent heat of vaporization of water, and an absorber for reintroducing the water vapor generated in said evaporator into said concentrated lithium salt solution of predetermined concentration supplied from said second generator thereby diluting said concentrated lithium salt solution.

According to another feature of the present invention, said first generator acts to heat to boil said dilute lithium salt solution therein at a temperature which is not so high as to generate all the water vapor to be separated in said separator.

According to still another feature of the present invention, said second generator acts to heat said lithium salt solution fed therein from said first generator so that water vapor can be further expelled under the pressure therein to concentrate said lithium salt solution to the predetermined concentration.

According to yet another feature of the present invention, the temperature of heating in said first generator at its highest does not exceed that in said second generator.

According to a further feature of the present invention, said gas-liquid lift conducting the mixture of said lithium salt solution and said water vapor from said first generator to said second generator has a sectional area which is selected to provide a maximum liquid lifting effect in relation to the quantity of heat applied to said dilute lithium salt solution in said first generator.

According to a still further feature of the present invention, the ratio between the quantity of heat $Q_1$ applied to said dilute lithium salt solution in said first generator and the total quantity of heat $Q_t$ applied to the system is selected to be equal to the ratio $(\epsilon_2 - \epsilon_1)/(\epsilon_3 - \epsilon_1)$, where $\epsilon_1$ is the original concentration of said dilute lithium salt solution, $\epsilon_2$ is the concentration of said lithium salt solution heated to boil in said first generator, and $\epsilon_3$ is the concentration of said concentrated lithium salt solution.

Various other objects, features and advantages of the present invention will become apparent from the following detailed description of a preferred embodiment thereof taken in conjunction with the accompanying drawings.

DESCRIPTION OF THE PREFERRED EMBODIMENT

Figure 1:
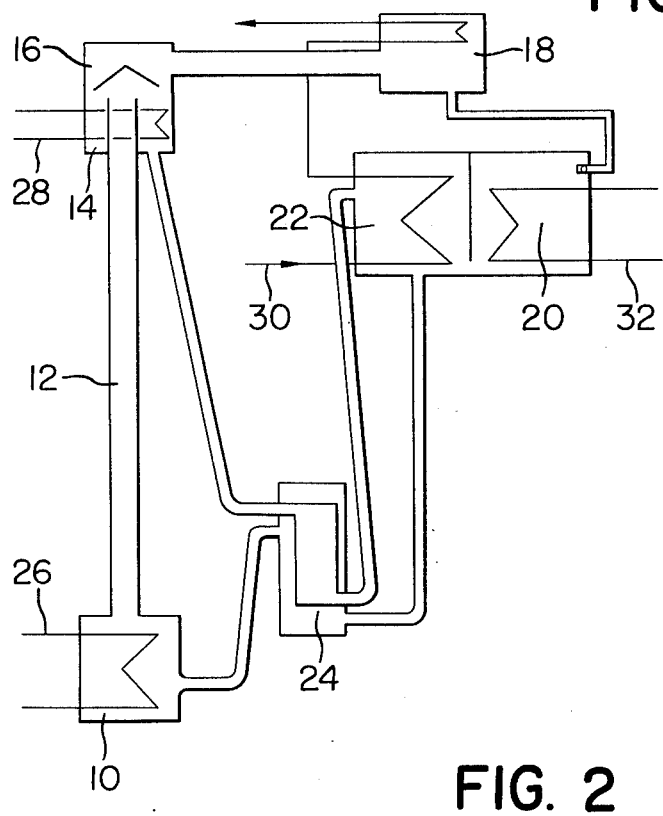
FIG. 1 is a diagrammatic view of an embodiment of the absorption refrigerator of natural circulation type according to the present invention.

FIG. 1 of the accompanying drawings shows diagrammatically the structure of a preferred embodiment of the absorption refrigerator of natural circulation type according to the present invention.

The absorption refrigerator of natural circulation type shown in FIG. 1 is generally similar in structure to a prior art absorption refrigerator of this type except that a second generator 14 is connected to the upper end of a gas-liquid lift 12. More precisely, the absorption refrigerator of natural circulation type embodying the present invention comprises a second generator 14 in addition to a first generator 10, a gas-liquid lift 12, a separator 16, a condenser 18, an evaporator 20, an absorber 22, and a heat exchanger 24. These members are connected directly or by suitable conduits to each other and constitute a closed system so as to maintain therein a pressure lower than the atmospheric pressure.

Referring to FIG. 1, a heating medium flows through a heating coil 26 extending into the first generator 10 for heating to boil an aqueous solution of a lithium salt contained in the first generator 10 thereby expelling water vapor from the dilute lithium salt solution. The first generator 10 is connected by the gas-liquid lift 12 to the second generator 14 which is disposed above the first generator 10 and housed within the separator 16. The water vapor expelled in bubble form from the lithium salt solution in the first generator 10 is carried upward together with the lithium salt solution into the second generator 14 according to the principle of a so-called air lift pump. The lithium salt solution fed into the second generator 14 is concentrated to a desired concentration by a heating medium flowing through a heating coil 28 extending into the second generator 14. Water vapor expelled from the lithium salt solution due to the concentration in the second generator 14 is separated from the concentrated lithium salt solution by the separator 16 and is then introduced into the condenser 18, while the concentrated lithium salt solution flows into the heat exchanger 24 from the separator 16. Cooling water is supplied by a conduit 30 to flow through the condenser 18 for cooling to condense the water vapor. The condenser 18 is connected to the evaporator 20 by a conduit. Water produced as a result of the condensation of the water vapor is sprayed into the evaporator 20 in which a reduced pressure is maintained. Thus, the water sprayed into the evaporator 20 is vaporized again, and while being vaporized, a secondary refrigerant flowing through a conduit 32 is cooled by the latent heat of vaporization of water. The water vapor is then fed to the absorber 22 connected to the evaporator 20 to be absorbed into the concentrated lithium salt solution which is supplied to the absorber 22 after being separated by the separator 16 and having the temperature thereof reduced as a result of heat exchange in the heat exchanger 24. The lithium salt solution thus diluted by absorbing the water vapor in the absorber 22 is then subject to heat exchange with the concentrated lithium salt solution in the heat exchanger 24. The dilute lithium salt solution having the temperature thereof increased as a result of the heat exchange is returned again to the first generator 10.

It will be seen that the absorption refrigerator of natural circulation type according to the present invention has a structure and function as above described. The operating characteristic of the absorption refrigerator of the present invention will be described with reference to FIG. 2 while comparing it with that of a prior art absorption refrigerator of this type as disclosed in the cited patent.

Figure 2:
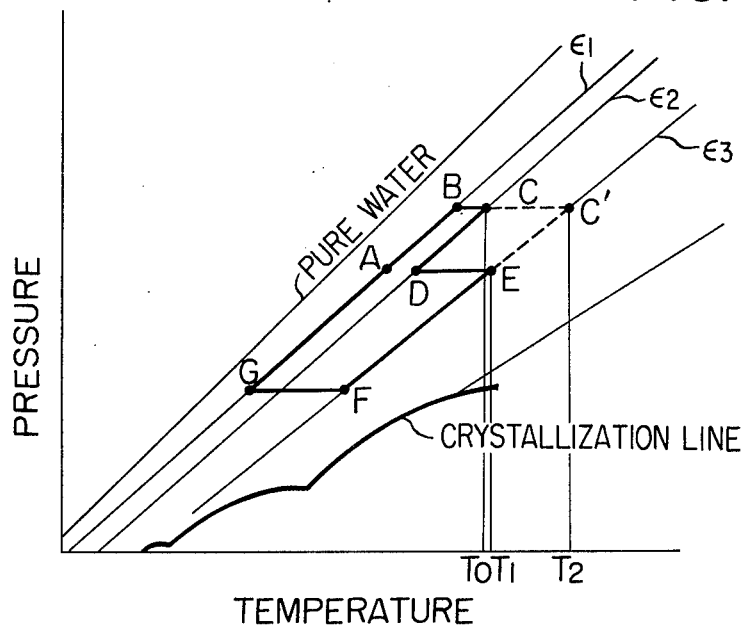
FIG. 2 is a graph showing the relation between the pressure and the temperature of an aqueous solution of an absorbing medium used in the absorption refrigerator shown in FIG. 1 with the concentration of the solution taken as a parameter.

FIG. 2 is a graph showing the relation between the pressure and the temperature of an aqueous solution of a lithium salt used in the absorption refrigerator of natural circulation type according to the present invention and the prior art absorption refrigerator of this type with the concentration of the solution taken as a parameter.

Referring to the graph of FIG. 2, the cycle A → B → C' → E → F → G → A represents the behavior of the lithium salt solution in the prior art absorption refrigerator of natural circulation type. In the cycle portion A → B → C', the dilute lithium salt solution of concentration $\epsilon_1$ is heated and the concentration thereof increased up to $\epsilon_3$ by the heat applied thereto in the single generator, and in the subsequent cycle portion C' → E, the pressure and temperature of the concentrated lithium salt solution are reduced as it is lifted through the gas-liquid lift. In the cycle portion E → F, the temperature of the concentrated lithium salt solution is further reduced as a result of the heat exchange in the heat exchanger, and in the cycle portion F → G, the concentrated lithium salt solution is diluted in the absorber. In the cycle portion G → A, the temperature of the diluted lithium salt solution is raised as a result of the heat exchange in the heat exchanger.

In the prior art absorption refrigerator of natural circulation type, only one generator is connected to the lower end of the gas-liquid lift, and the dilute lithium salt solution heated to boil in the single generator flows upward through the gas-liquid lift into the separator connected to the upper end of the gas-liquid lift so as to be separated into the water vapor and the concentrated lithium salt solution in the separator. More precisely, referring to FIG. 2, the heating of the dilute lithium salt solution of concentration $\epsilon_1$ in the generator is started at the point A, and the temperature of the dilute lithium salt solution is gradually raised until it starts to boil at the point B. The dilute lithium salt solution is further heated and concentrated until the point C' is reached at which the concentration is $\epsilon_3$. Since a pressure difference exists between the generator and the separator due to the resistance and height of the gas-liquid lift, the water in the concentrated lithium salt solution fed to the separator is vaporized in the separator due to the reduced internal pressure, and the pressure and temperature of the concentrated lithium salt solution are reduced from the point C' to the point E as a result of self-cooling. Therefore, in order that the concentrated lithium salt solution in the separator has the desired concentration $\epsilon_3$ at the point E (corresponding to a temperature $T_1$), the dilute lithium salt solution must be heated in the generator up to a temperature at which the pressure is higher than that at the temperature $T_1$ by the vapor pressure corresponding to the pressure reduction above described, that is, up to the point C' at which the temperature is $T_2$ and the concentration is $\epsilon_3$.

In the case of the absorption refrigerator of natural circulation type according to the present invention, the first generator 10 connected to the lower end of the gas-liquid lift 12 serves for the circulation of and preliminary heating for suitably concentrating the dilute lithium salt solution, and the second generator 14 connected to the upper end of the gas-liquid lift 12 serves for concentrating the lithium salt solution supplied from the first generator to a predetermined concentration.

The behavior of the lithium salt solution in the absorption refrigerator of natural circulation type according to the present invention is represented by the cycle A → B → C → D → E → F → G → A in FIG. 2. Referring to FIG. 2, the heating of the dilute lithium salt solution of concentration $\epsilon_1$ in the first generator 10 is started at the point A so that the heated lithium salt solution can be urged upward through the gas-liquid lift 12, and the point C is reached at which the temperature and concentration of the lithium salt solution are $T_o$ and $\epsilon_2$ respectively. The lithium salt solution of concentration $\epsilon_2$ thus obtained is fed to the second generator 14 disposed in the separator 16. The pressure and temperature of the lithium salt solution of concentration $\epsilon_2$ are reduced from the point C to the point D as a result of self-cooling caused by the vaporization of water due to the pressure difference. The lithium salt solution of such a state is then heated to be concentrated under low pressure in the second generator 14 until the point E is reached at which the pressure is the same and the concentration is increased to the desired value of $\epsilon_3$. In the absorption refrigerator of the present invention, therefore, the concentrated lithium salt solution of concentration $\epsilon_3$ corresponding to the point E can be obtained from the dilute lithium salt solution of concentration $\epsilon_1$ by merely heating the dilute lithium salt solution in the first generator 10 up to a temperature lower than $T_2$, that is, $T_o$ in FIG. 2, and then heating the lithium salt solution in the second generator 14 up to a temperature lower than $T_2$, that is $T_1$ in FIG. 2. In the present invention, the concentration $\epsilon_2$ is suitably selected, and the temperature $T_o$ at the point C is set so that it may not exceed the temperature $T_1$ at the point E. This manner of concentration selection and temperature setting is effective in increasing the temperature difference ($T_2 - T_1$) to a maximum or reducing the temperature $T_o$ to a minimum. It will thus be seen that the absorption refrigerator of natural circulation type according to the present invention can operate with the efficiency comparable with that of the prior art absorption refrigerator of this type although the temperature of the heating medium is lower than heretofore bu ($T_2 - T_1$).

The ratio between the quantity of heat $Q_1$ applied to the first generator 10 and the total quantity of heat $Q_t$ applied to the system is preferably selected to be equal to the ratio $(\epsilon_2 - \epsilon_1)/\epsilon_3 - \epsilon_1)$. However, due to the fact that the maximum liquid lifting effect of the gas-liquid lift is generally proportional to the ratio between the sectional area of the gas-liquid lift and the quantity of applied heat, it is necessary to reduce the sectional area of the gas-liquid lift by the value corresponding to the reduction in the quantity of heat applied to the first generator 10 in order to obtain the maximum liquid lifting effect.

The absorption refrigerator of natural circulation type according to the present invention having a structure as above described can operate with high efficiency with warm water of relatively low temperature supplied from a solar energy collector, especially a planar heat collector of this type. Thus, the heat collecting efficiency can be improved so that the heat collecting area can be reduced to reduce the cost of the heat collector. Further, the absorption refrigerator can also operate efficiently with warm waste water discharged from various plants. Thus, the absorption refrigerator finds a variety of applications. Furthermore, the absorption refrigerator of the present invention can operate efficiently with warm water discharged from an existing refrigerator of this kind. This is advantageous in that the operating efficiency can be substantially doubled.

As many apparently widely different embodiments of this invention may be made without departing from the spirit and scope thereof, it is to be understood that the invention is in no way limited to the specific embodiment thereof except as defined in the appended claims.

What is claimed is:

1. An absorption refrigerator of natural circulation type employing water as a refrigerant and lithium salt as an absorbing medium comprising generating means for expelling water vapor from an aqueous solution of lithium salt, a separator for separating the expelled water vapor from the concentrated lithium salt solution, a condenser for condensing the water vapor separated in said separator; an evaporator having a second refrigerant flowing therethrough for vaporizing the water condensed in said condenser and thereby cooling the secondary refrigerant flowing therethrough by the latent heat of vaporization of water; and an absorber for reintroducing the water vapor vaporized in said evaporator into the concentrated lithium salt solution, characterized in that the generating means comprises a first generator for expelling water vapor from the aqueous solution of lithium salt to lift the lithium salt solution through a gas-liquid lift according to the principle of an air lift pump for the purpose of causing the natural circulation of the lithium salt solution, a second generator connected by said gas-liquid lift to said first generator for concentrating the lithium salt solution fed thereto by heating it so as to expel additional water vapor therefrom to concentrate said lithium salt solution to the predetermined concentration, and wherein the ratio between the quantity of heat $Q_1$ applied to said dilute lithium salt solution in said first generator and the total quantity of heat $Q_t$ applied to the system is selected to be equal to the ratio $(\epsilon_2 - \epsilon_1)/\epsilon_3 - \epsilon_1)$, where $\epsilon_1$ is the original concentration of said dilute lithium salt solution, $\epsilon_2$ is the concentration of said lithium salt solution heated to boil in said first generator, and $\epsilon_3$ is the concentration of said concentrated lithium salt solution.

* * * * *

UNITED STATES PATENT OFFICE
CERTIFICATE OF CORRECTION

Patent No. 4,014,183        Dated March 29, 1977

Inventor(s) Toshihiro Ishibashi et al

It is certified that error appears in the above-identified patent and that said Letters Patent are hereby corrected as shown below:

Column 1, line 48, change "subjected" to --subject--

Column 6, line 2, change "bu" to --by--

Signed and Sealed this twenty-sixth Day of July 1977

[SEAL]

Attest:

RUTH C. MASON
*Attesting Officer*

C. MARSHALL DANN
*Commissioner of Patents and Trademarks*